3,414,597
METALLOCENYLARYL-SUBSTITUTED ORGANO-
SILICON MATERIALS
Edward V. Wilkus, Albany, and Abe Berger, Schenectady, N.Y., assignors to General Electric Company, a corporation of New York
No Drawing. Filed Dec. 1, 1964, Ser. No. 415,185
6 Claims. (Cl. 260—429)

ABSTRACT OF THE DISCLOSURE

There are provided organosilicon materials substituted with metallocenylaryl radicals. These materials can be made by effecting reaction between the Grignard of a haloarylmetallocene, for example, the Grignard of p-bromophenylferrocene, and a halosilylorganic material such as a halosilane, as shown by the following equation, $$R_3SiX + XMgR''Z \rightarrow R_3SiR''Z + MgX_2$$

where Z is a metallocene. The metallocenyl-substituted materials of the present invention can be converted to polymers, or employed as U.V. stabilizers for organopolysiloxane polymers.

---

The present invention relates to organosilicon materials having a metallocenylaryl radical, such as a ferrocenylphenyl radical, attached to silicon by carbonsilicon linkages.

In our copending application Ser. No. 283,525 filed May 27, 1963, now Patent No. 3,321,501, assigned to the same assignee as the present invention, there is shown certain metallocenyl-substituted-organosilicon materials, and a method for making them. These metallocenyl-substituted-organosilicon materials are made by acylating a metallocene, such as ferrocene, with a silyl acid halide of the formula, (1)
$$R_3Si-R'\overset{\overset{H}{\|}}{C}X$$

where R is a member selected from hydrogen, halogen radicals, monovalent hydrocarbon radicals, halogenated monovalent hydrocarbon radicals, cyanoalkyl radicals, and fluoroalkyl radicals, R' is a divalent radical of at least two carbon atoms selected from a hydrocarbon radical and a halogenated hydrocarbon radical, and X is a halogen radical.

Because the method of the aforementioned copending application is based on a Friedel-Crafts acylation reaction, the resulting acylated metallocene contains at least one carbonyl group adjacent to the metallocene nucleus.

It has been found that the utility of many metallocenyl-substituted-organosilicon materials, such as disclosed in the aforementioned copending application, is based on their solubility characteristics in various solvents. For example, although silicon-containing-metallocenes have generally been found to be valuable as antioxidant and lubricity additives, the carbonyl-containing analogues often have reduced effectiveness. Such carbonyl-containing organosilicon materials have been found to be substantially less compatible in hydrocarbons because they have significant polarity. Another application in which solvent compatibility is important, is the employment of silicon-containing metallocenes as U.V. absorbers in organopolysiloxane compositions. Unless a satisfactory degree of compatibility of the silicon-containing-metallocene is achieved in the organopolysiloxane, for example, an organopolysiloxane varnish, the silicon-containing-metallocene can migrate and be less effective as a U.V. absorber. Experience has also shown that compatibility of carbonyl - containing-metallocenyl-organosilicon materials can be improved in non-polar solvents, such as hydrocarbon oils by reducing the carbonyl group to methylene. However, in these instances, the resulting metallocenyl-organosilicon materials suffer from reduced oxidative stability in instances where R' of Formula 1 is arylene, as a result of forming an arylenemethylene bridge between the silicon atom and the metallocene nucleus.

The metallocenyl-substituted-organosilicon materials of the present invention, referred to hereinafter as the "metallocenylaryl-substituted-organosilicon materials," are characterized by having at least one silylaryl radical of the formula, (2) $\qquad A'(A)_2SiR''-$ attached to a metallocene nucleus, where A is selected from R radicals as defined above, and alkoxy radicals, A' is selected from A and a hydroxy radical, and R'' is selected from arylene and halogenated arylene radicals. The metallocenes that can be employed in the practice of the invention are composed of a transition metal chemically combined with two cyclopentadienyl radicals whose free valences, other than those satisfied with said silylaryl radical of Formula 2, are satisfied with monovalent radicals selected from hydrogen, electron donating organic radicals, electron withdrawing organic radicals, and mixtures thereof.

Included by the metallocenylaryl-substituted-organosilicon materials of the present invention, are silanes of the formula, (3) $\qquad R_3SiR''Z$ and bis(silylorgano)metallocenes of the formula, (4) $\qquad (R_3SiR'')_2Z'$ where R and R'' are as defined above, Z is a monovalent metallocenyl radical, and Z' is a divalent metallocenyl radical.

Metallocenes, such as ferrocene, osmocene, ruthenocene, etc., can be employed in the practice of the invention to provide for the above monovalent Z radicals, and divalent Z' radicals of Formulae 3 and 4, which have the formula, (5) $\qquad [Q_nC_5]M[C_5Q_{n'}]$ where M is a transition metal, Q is a monovalent radical chemically bonded to a cyclopentadienyl radical and selected from the class of hydrogen, a monovalent electron withdrawing radical, and a monovalent electron donating radical, $n$ is an integer equal to 1 to 4, inclusive, and $n'$ is an integer equal to 1 to 5, inclusive.

The transition metals shown by M of Formula 5, include for example, metals having atomic numbers 22 to 28, 40 to 46, and 72 to 78, such as titanium, vanadium, chromium, manganese, iron, cobalt, nickel, zirconium, columbium, molybdenum, technetium, ruthenium, rhodium, palladium, hafnium, tantalum, tungsten, rhenium, osmium, indium, and platinum.

Radicals included by R of Formula 1 are aryl radicals, and halogenated aryl radicals such as phenyl, chlorophenyl, xylyl, tolyl, etc. Aralkyl radicals such as phenylethyl, benzyl, etc., aliphatic, haloaliphatic, and cycloaliphatic such as alkyl, alkenyl, cycloalkyl, haloalkyl, including methyl, ethyl, propyl, butyl, cyclohexyl; halogen radicals such as chloro, bromo, etc., cyanoalkyl radicals such as cyanoethyl, cyanopropyl, cyanobutyl, etc.; and fluoroalkyl radicals, such as fluoroethyl, fluoropropyl, fluorobutyl, etc. Radicals included by R'' are phenylene, chlorophenylene, fluorotolylene, naphthylene, tolylene, xylylene, etc. Except when A' of Formula 2 is hydroxy, in instances where R, R', A' and R'' of the above formulae can represent more than one radical respectively, these radicals can be all the same, or any two or more of the aforementioned radicals.

Monovalent electron donating radicals included by Q of Formula 5 are aryl radicals, hydroxyaryl radicals, such as phenyl, tolyl, hydroxyphenyl, etc.; aliphatic radicals including alkyl radicals, such as methyl, ethyl, propyl, butyl, octyl, etc.; alkenyl radicals such as vinyl, propenyl, etc.; cycloaliphatic such as cyclohexyl, cycloheptyl, etc.; carboxy aliphatic radicals such as carboxymethyl, carboxy-ethyl, etc.; nitroaliphatic radicals such as nitromethyl, nitroethyl, etc. Monovalent electron withdrawing radicals included by Q of Formula 5, are aliphatic acyl, such as formyl, acetyl, propionyl; arylacyl such as benzoyl, etc.; carboxy, aldehydic, sulfo; carboxyaryl, such as carboxyphenyl, carboxytolyl, etc.; nitroaryl such as nitrophenyl; haloaryl such as chlorophenyl, bromotolyl, etc.; haloaliphatic such as chloromethyl, chloroethyl, etc.; Q can be all the same radical, or any two or more of the aforementioned electron donating radicals or electron withdrawing radicals.

The metallocenylaryl-substituted silanes of Formula 3, can be made by reacting the Grignard of a haloarylmetallocene of the formula, (6)    ZR″MgX with a halosilane of the formula, (7)    R₃SiX where R, R″, Z and X are as defined above. The Grignard of haloarylmetallocene of Formula 6 can be made by the procedure of William F. Little et al., Journal of Organic Chemistry, vol. 20, p. 713 of March 1964. The haloaryl-metallocene can be made by the procedure of Victor Weinmayer, Journal American Chemical Society, 77, 3012 (1955), by condensing a diazonium salt of a halogenated aromatic hydrocarbon with a metallocene in the presence of concentrated sulphuric acid. The corresponding dihaloarylmetallocene employed for making the organosilicon materials of Formula 4 can be made by utilizing two moles of diazotized halogenated aromatic hydrocarbon, per mole of metallocene in accordance with the aforementioned procedure of Victor Weinmayer. The di-Grignard of the formula, (8)    XMgR″Z′R″MgX can be made by the above procedure of Little et al., from the corresponding dihaloarylmetallocene. Reaction between the di-Grignard of Formula 8 and the halosilane of Formula 7 provide for the organosilicon materials of Formula 4.

Included by the silanes of Formula 3, are for example, p-trimethylsilylphenylferrocene, α-dimethylethyl - silyl-naphthylruthenocene, p - chloromethylidimethylsilyl-phenyl - ferrocene, α - (γ,γ,γ - trifluoropropyldimethyl-silyl) - naphthylosmocene, etc. Included by the bis(silylorgano) - metallocenes of Formula 4, are for example, 1,1′ - bis - (p - trimethylsilylphenyl)ferrocene, 1,1 - bis-(α - chlorodimethyl - silylnaphthyl)osmocene, etc.

Included by the halosilanes of Formula 7, are for example, silicon tetrahcloride, trimethylchlorosilane, dimethyldichlorosilane methyltrichlorosilane, phenylmethyldichlorosilane chloromethylphenyldichlorosilane, methyldichlorosilane, etc.

Metallocenylaryl - substituted polymers can be made from some of the metalloceneylaryl-substituted organosilicon materials of the invention in accordance with the procedure shown in our copending applications, Ser. Nos. 283,544, and 283,530, filed May 27, 1963, and assigned to the same assignee as the present invention. These polymers can be blended with fillers such as fume silica, silica aerogel, non-reinforcing filler such as ground quartz, zinc oxide, etc. Cure of these linear polymers can be effected with organotriacyloxy silanes such as methyltriacetoxy silane, or by use of ethylorthosilicate and a metal soap in accordance with the procedure of Berridge Patent 2,843,555. Heat stabilizers, and plasticizers can be utilized in combination with the other ingredients.

The metallocenylaryl - substituted - organosilicon materials of the present invention can be utilized directly in organopolysiloxane polymers and organopolysiloxane organic copolymers, to stabilize such polymers against degradation resulting from U.V., heat, oxidation, etc. These materials also can be used to enhance the lubricating characteristics of organic fluids, and antiknock qualities of hydrocarbon fuels.

In the practice of the invention, the Grignard of a haloarylmetallocene as shown by Formula 6, is reacted with a halosilane of Formula 7. The resulting metallocenylaryl-substituted silane or bis(silylorgano)metallocene, both referred to sometimes in the following descriptions as the metallocenylaryl - substituted - silane, can be hydrolyzed further to produce polymers and copolymers depending upon the nature of the radicals attached to silicon.

Reaction between the Grignard of the haloaryl-metallocene and halosilane can be achieved by conventional procedures. Experience has shown that a temperature in the range of from 30° C. to 100° C. can be utilized. Organic solvents such as tetrahydrofuran, dimethoxyethane, di-n-butyl-ether, etc., can be employed.

Recovery of the metallocenylaryl-substituted-silane can be achieved directly by conventional extraction procedures, such as chromatography, etc.

In order that those skilled in the art will be better able to practice the invention, the following examples are given by way of illustration, and not by way of limitation. All parts are by weight.

EXAMPLE 1

There were added with stirring to a solution of 100 parts of ferrocene and 500 parts of 96% sulphuric acid, at a temperature of about 25° C., a mixture obtained by diazotizing 86 parts of para-bromoaniline in 500 parts of 20% sulphuric acid at 0° C. to 5° C. The para-bromoaniline was diazotized by adding to a solution of the para-bromoaniline and 20% sulphuric acid, at a temperature of about 0 to 5° C., a stoichiometric amount of sodium nitrite in the form of an aqueous solution.

After a period of 24 hours, the mixture was filtered of solids, and extracted with benzene. There were added 100 parts of zinc dust to the filtrate. The resulting mixture was stirred for about 1 hour and extracted with ether. The ether was stripped and the residue was steam distilled to remove unreacted ferrocene. The product was again extracted with ether and recrystallized with 90% acetic acid. There were obtained 45 parts of product having a melting point of 124–126° C. Based on its method of preparation and infrared spectrum, the product was p-bromophenylferrocene.

A mixture of 17 parts of p-bromophenylferrocene, 3.7 parts of dry magnesium turnings, 7.1 parts of methyl-iodide, and 750 parts of tetrahydrofuran were refluxed for 48 hours under a nitrogen atmosphere. The reaction mixture was then allowed to settle. It was filtered of magnesium, and added dropwise to a solution of 54 parts of trimethylchlorosilane, and 50 parts of tetrahydrofuran. After the addition was completed, the reaction mixture was brought to reflux and there maintained for an additional 5 hours. The reaction was cooled and poured onto ice. The organic phase was separated, dried, concentrated, and chromatographed on alumina. The main band was eluted with hexane. There was obtaind 0.8 part of an organic solid having a melting point of 109° C. to 110° C. Based on its method of preparation and its infrared spectrum, it was trimethylsilylphenylferrocene.

The solubility of trimethylsilylphenylferrocene was compared to trimethylsilylbenzoylferrocene in 2,2,4-trimethylpentane, and octamethylcyclotetrasiloxane. The trimethylsilylbenzoylferrocene was prepared by the method shown in our copending application Ser. No. 283,525, filed May 27, 1963, as previously cited. The table below shows the results obtained. Solubility is expressed in parts by weight of metallocenylaryl-silane, per 100 parts of weight of solvent, at 25° C. In the table "Benzoyl" is trimethylsilylbenzoylferrocene, and "Phenyl" is trimethylsilylphenylferrocene.

|  | 2,2,4-trimethyl pentane | Octamethyl-cyclotetrasiloxane |
|---|---|---|
| Benzoyl | 1.8 | 0.16 |
| Phenyl | 4 | 1.4 |

EXAMPLE 2

A mixture of diazotized p-bromophenylaniline and ferrocene are prepared in accordance with the procedure of Example 1. Before the mixture is reduced with zinc dust, it is extracted with benzene, and the crude product is recrystallized from high boiling petroleum ether. There is recovered 1,1'-bis(p-bromophenyl)ferrocene. Its structure is confirmed by its infrared spectrum.

A solution of 4.9 parts of the 1,1'-bis(p-bromophenyl)-ferrocene, 2.8 parts of methyliodide, 1.4 parts of magnesium, and 750 parts of anhydrous tetrahydrofuran are held at reflux for 48 hours under nitrogen. The liquid and salts are then separated from the magnesium by decanting the mixture by use of a separatory funnel. The liquid phase is added dropwise to a solution of 65 parts of trimethylchlorosilane and 60 parts of tetrahydrofuran. The reaction mixture is brought to reflux and refluxed for 5 additional hours. The resulting mixture is then poured onto ice, and the organic layer separated from the aqueous phase. The organic layer is dried, filtered, and chromatographed. An organic fraction is obtained which is eluted with a 1:1 hexane-benzene solvent mixture. The product is allowed to crystallize and filtered. Based on its method of preparation and its infrared spectrum the product is 1,1'-bis(p-trimethylsilylphenyl)ferrocene.

EXAMPLE 3

A reaction mixture consisting of 3.8 parts of p-bromophenylruthenocene prepared by the procedure shown in Example 1 for making p-bromophenylferrocene, 0.72 part of magnesium metal, and 1.4 parts of methyliodide in 25 parts anhydrous tetrahydrofuran, is refluxed for 48 hours. The reaction mixture is separated from the excess magnesium metal by decanting it under a nitrogen atmosphere into a separatory funnel. This Grignard solution is then added to a solution of 10.8 parts trimethylchlorosilane in 10 parts tetrahydrofuran. After the addition, the reaction mixture is refluxed for 5 hours, poured onto ice, the organic layer is separated, dried, filtered, and concentrated to a small volume. The mixture is chromatographed and eluted with hexane. A product is obtained. Its infrared spectrum and method of preparation shows that the product is p-trimethylsilylruthenocene.

Based on the results shown in Example 1, those skilled in the art would know that the metallocenylaryl-substituted-organosilicon materials of the present invention can be utilized in a variety of applications requiring materials having a satisfactory degree of compatibility in hydrocarbon oils, as well as organopolysiloxanes. In addition, based on the fact that arylsilicon bonds have a high degree of oxidative stability, the metallocenylaryl-substituted-organosilicon materials of the invention can be employed in various applications requiring materials having the ability to resist change at elevated temperatures.

While the foregoing examples have of necessity been limited to only a few of the very many variables within the scope of the present invention, the present invention is also directed to a much broader class of metallocenyl-aryl-substituted-organosilicon materials, such as metallocenes having at least one silylaryl radical of Formula 1, as well as metallocenylaryl-substituted-organosilicon materials shown by Formulae 3 and 4.

What we claim as new and desire to secure by Letters Patent of the United States is:

1. Metallocenylaryl-substituted-organosilicon materials having at least one silylaryl radical of the formula:

$$A'(A)_2SiR''-$$

attached to a metallocene selected from the class consisting of ferrocene, osmocene and ruthenocene substituted with radicals selected from the class consisting of hydrogen and a mixture of hydrogen and a member selected from the class consisting of alkyl radicals, halongenated alkyl radicals, aryl radicals, halongenated aryl radicals, and mixtures thereof, where A is a member selected from the class consisting of hydrogen, halogen radicals, monovalent hydrocarbon radicals, halogenated monovalent hydrocarbon radicals, cyanoalkyl radicals, and alkoxy radicals, A' is selected from A radicals and a hydroxy radical, and R'' is a divalent radical selected from the class consisting of p-arylene radicals, and halogenated p-arylene radicals.

2. Silanes of the formula, $$R_3SiR''Z$$

where R is a member selected from the class consisting of hydrogen, halogen radicals, monovalent hydrocarbon radicals, halogenated monovalent hydrocarbon radicals, and cyanoalkyl radicals, R'' is a divalent radical selected from the class consisting of p-arylene radicals, and halogenated p-arylene radicals, and Z is a metallocene selected from the class consisting of ferrocene, osmocene and ruthenocene substituted with radicals selected from the class consisting of hydrogen, and a mixture of hydrogen and a member selected from the class consisting of alkyl radicals, halongenated alkyl radicals, aryl radicals, halongenated aryl radicals, and mixtures thereof.

3. Organosilicon materials having the formula, $$(R_3SiR'')_2Z'$$

where R is a member selected from the class consisting of hydrogen, halogen radicals, monovalent hydrocarbon radicals, halogenated monovalent hydrocarbon radicals, and cyanoalkyl radicals, R'' is a divalent radical selected from the class consisting of p-arylene radicals, and halogenated p-arylene radicals, and Z' is a divalent radical of a metallocene selected from the class consisting of ferrocene, osmocene and ruthenocene substituted with radicals selected from the class consisting of hydrogen, and a mixture of hydrogen and a member selected from the class consisting of alkyl radicals, halogenated alkyl radicals, aryl radicals, halogenated aryl radicals, and mixtures thereof.

4. p-Trimethylsilylphenylferrocene.
5. 1,1'-bis(p-trimethylsilylphenyl)ferrocene.
6. p-Trimethylsilylphenylruthenocene.

References Cited

UNITED STATES PATENTS

| 3,060,215 | 10/1962 | Rosenburg | 260—439 |
| 3,321,501 | 5/1967 | Wilkus et al. | 260—429 |
| 3,329,695 | 4/1967 | Wilkus et al. | 260—429 |

TOBIAS E. LEVOW, *Primary Examiner.*

A. P. DEMERS, *Assistant Examiner.*